United States Patent
Artmann et al.

(10) Patent No.: US 7,040,160 B2
(45) Date of Patent: May 9, 2006

(54) FLOW SENSOR

(75) Inventors: Hans Artmann, Magstadt (DE);
Thorsten Pannek, Stuttgart (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 10/432,542

(22) PCT Filed: Oct. 11, 2001

(86) PCT No.: PCT/DE01/03906

§ 371 (c)(1),
(2), (4) Date: Sep. 29, 2003

(87) PCT Pub. No.: WO02/42723

PCT Pub. Date: May 30, 2002

(65) Prior Publication Data

US 2004/0069626 A1    Apr. 15, 2004

(30) Foreign Application Priority Data

Nov. 23, 2000    (DE) .......................... 100 58 009

(51) Int. Cl.
G01F 1/68    (2006.01)

(52) U.S. Cl. .................................. 73/204.26
(58) Field of Classification Search ............. 73/204.26, 73/204.25, 204.16
See application file for complete search history.

(56) References Cited

U.S. PATENT DOCUMENTS

| 4,478,076 A | * | 10/1984 | Bohrer ................. 73/204.16 |
| 4,680,963 A | * | 7/1987 | Tabata et al. ............ 73/204.18 |
| 5,231,878 A | | 8/1993 | Zanini-Fisher |
| 5,310,449 A | | 5/1994 | Henderson |
| 5,311,775 A | | 5/1994 | Suski et al. |
| 5,317,920 A | * | 6/1994 | Kremidas .................... 73/720 |
| 6,631,638 B1 | * | 10/2003 | James et al. ............ 73/204.26 |

FOREIGN PATENT DOCUMENTS

| DE | 197 52 208 | 6/1999 |
| DE | 100 30 352 | 1/2002 |
| WO | WO 98 36247 | 8/1998 |
| WO | WO 98/50763 | 11/1998 |

OTHER PUBLICATIONS

Ohnstein, T.R., et al. In: Technical Digest IEEE Solid–State Sensors and Actuator Workshop, Seiten 158–160, Jun. 1990.
Menz, W., Mohr, J.: Microsystemtechnik für Ingenieure, ISBN 3–527–29405–8, Seiten 214/2127.

* cited by examiner

Primary Examiner—Edward Lefkowitz
Assistant Examiner—Jewel Thompson
(74) Attorney, Agent, or Firm—Kenyon & Kenyon

(57) ABSTRACT

A flow sensor is described, in particular for analysis of gas flows, having a substrate and at least one sensor component which is sensitive to a flow of a medium, the sensor component being separated from the substrate in at least some areas by a region that is a poor heat conductor compared to the substrate. In addition, the region having poor heat conductivity is a porous silicon region or a porous silicon oxide region, or the region having poor heat conductivity is a recess in the surface of the substrate above which the sensor element (15) is situated on at least one web which bridges the recess and is at least mostly unsupported. The flow sensor described here is particularly suitable for angle-dependent detection of a gas flow.

19 Claims, 2 Drawing Sheets

FLOW SENSOR

FIELD OF THE INVENTION

The present invention relates to a flow sensor, in particular for analysis of gas flows.

BACKGROUND INFORMATION

Currently available flow sensors are often embodied in the form of thin-film membrane sensors, using the anemometric method to determine the particular flow.

In addition, PCT Publication No. 98/50763 has already described an integrated gas flow sensor in which a recess is produced in a silicon wafer and then is covered with an unsupported membrane having a two-ply layer of polysilicon/silicon dioxide or polysilicon/silicon nitride. In addition, integrated thermocouples and a resistance heating conductor are also provided on this unsupported membrane. The recess beneath the unsupported membrane provides thermal insulation of the thermocouples from the silicon substrate. To produce this integrated flow sensor, a surface micromechanical structuring method for silicon is used in which a layer of porous silicon functions as a sacrificial layer. The thermocouples are made of polycrystalline p-type silicon/aluminum, for example, or polycrystalline n-type silicon/polycrystalline p-type silicon. The resistance heating conductor is a strip of polycrystalline silicon.

German Published Patent Application No. 100 30 352 describes a sensor element situated on an unsupported membrane which is stabilized with webs, a recess being created beneath the unsupported membrane by converting silicon to porous silicon and/or porous silicon dioxide. In addition, that patent application describes the use of a such a sensor structure in a flow sensor.

In exposing membranes, a fundamental distinction is made between two methods, namely surface micromechanics, which generally uses a sacrificial layer produced on the front side of the substrate, e.g., a wafer, before deposition of the membrane. This layer is later removed from the front side through detachment openings in the membrane or in the substrate at the edge of the membrane. In addition, there is also the bulk micromechanical method in which the membrane which has already been produced is exposed from the rear side of the substrate by various etching methods, e.g., wet chemical methods or by a plasma etching method through an opening etched there.

The formation of porous silicon, which is known as a possible sacrificial layer for a surface micromechanical process, involves an electrochemical reaction between hydrofluoric acid and silicon in which a spongy structure is formed in the silicon. For this method, the wafer must be anodically polarized with respect to a hydrofluoric acid electrolyte. Due to the resulting porous structure, the silicon has a large internal surface area and therefore has different chemical and physical properties than the surrounding bulk silicon. In particular, the reactivity of porous silicon is greatly increased, thus permitting selective dissolution of porous silicon with respect to bulk silicon. To produce porous silicon, various doped silicon substrates are suitable, but p-doped wafers are generally used. The doping determines the size of the structure within the porous silicon.

Various masking methods and/or masking layers and an electrochemical etching stop are used in locally defined production of porous silicon. A thin layer at the surface of the p-doped silicon substrate is frequently redoped into n-doped silicon to function as the masking layer, e.g., by implantation or diffusion of a dopant into it, so that porous silicon is formed only in the p-doped regions in the subsequent electrochemical etching. Furthermore, the formation of porous silicon in this electrochemical etching process is isotropic, so the masking layer, which is applied first, is undercut completely, thus forming unsupported structures.

Another possibility of masking in addition to the use of redoped silicon is to use silicon oxide layers and silicon nitride layers as the masking layer, which may also be removed again in a subsequent process step. In this case the masking layer is also undercut isotropically.

For dissolving out porous silicon thus produced within a defined area, diluted potassium hydroxide solution and hydrofluoric acid may be used, but in the latter case it is necessary to convert the porous silicon which is produced first into porous silicon oxide in an additional oxidation step.

An object of the present invention was to implement a surface micromechanical flow sensor so that it will have an improved stability and an improved thermal insulation of the actual sensor elements with respect to the substrate. In addition, another object was to develop a flow sensor which would also allow angle-dependent detection of a flow, in particular a gas flow, and would permit an inexpensive and at the same time very flexible production method with regard to the layout of the flow sensor.

SUMMARY OF THE INVENTION

The flow sensor according to the present invention has the advantage over the related art that a very effective, simple and at the same time stable and reliable thermal insulation of the sensor elements on this porous region is made possible due to the porous silicon region and/or the porous silicon oxide region. In particular, it is now no longer necessary in contrast to the related art to produce a largely unsupported membrane on which the sensor elements are situated, so that it is possible to overcome the disadvantages associated with this membrane with regard to the complex etching technique required, an inadequate stability of the resulting membrane to some extent, a complex sawing technique, and the risk of soiling of the cavity thus produced.

The placement of the sensor components on an at least largely unsupported web bridging a recess has the advantage over the arrangement on an unsupported membrane that the thermal insulation of the sensor components is definitely improved and at the same time several sensor components situated on a network of webs may be situated above a recess without these individual sensor components being in direct thermal contact with one another, i.e., here again, there is a very good thermal insulation with respect to the substrate as well as the individual sensor components relative to one another.

Another advantage of the flow sensor according to the present invention is the possibility of producing it by surface micromechanics in silicon so that, for example, machining of a silicon wafer on both sides, which would often cause unwanted soiling, is no longer necessary.

Another advantage of the flow sensor according to the present invention is the simplified production and further processing of the substrate provided with the sensor components. This is true in particular in the case when the region having poor heat conductivity is a porous silicon region or a porous silicon oxide region, because in this case soiling of a cavity cannot occur in further processing by a conventional assembly and joining technique.

The use of porous silicon and/or porous silicon oxide as a thermal resistor in the recess also greatly increases the stability of the entire flow sensor.

It is advantageous if in addition to the sensor components at least one heating element, e.g., a heating conductor in the form of a platinum resistance printed conductor is provided which is capable of heating the sensor components, i.e., bringing them to the operating temperature.

It is also advantageous if the sensor component has a printed conductor, a thermistor, a thermocouple, or a thermoelectric pile, and it has also proven to be particularly advantageous to design the sensor component in the form of a platinum resistance conductor. However, other materials which may be deposited using the thin-film technology, such as polysilicon, platinum or aluminum, are also suitable for the heating element and/or sensor component.

To implement a flow sensor which also allows an angle-dependent detection of a gas flow, it is advantageous if a heating element and a plurality of sensor components are provided, arranged in particular symmetrically or in a star pattern or a cross pattern around the heating element or a central area, these individual sensor components each being separated from the substrate in at least some areas by a region that is a poor heat conductor compared to the substrate. Such a region is preferably provided for each individual sensor component. In this connection, it is also advantageous if the regions of the substrate which are not covered by one of the heat insulating regions are provided with a cover layer having good heat conductivity, e.g., a silicon or a platinum layer which functions as a heat sink and equalizes the temperatures within the cover layer.

DETAILED DESCRIPTION

Figure 1:
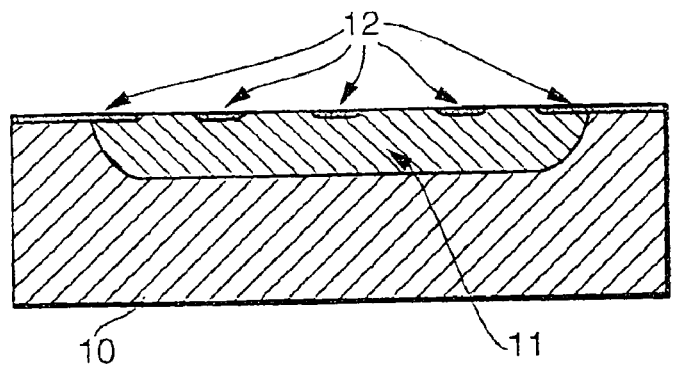
FIG. 1 shows a first method step for producing a flow sensor having a substrate and a porous silicon region in a sectional view.

A first exemplary embodiment of the present invention will now be explained on the basis of FIGS. 1 through 3. FIG. 1 shows first a p-doped silicon wafer as substrate 10, which is provided with a mask 12 on the surface. In the example explained here, mask 12 is an n-doped silicon layer produced by redoping. In addition, FIG. 1 shows that a region having porous silicon 11 is produced in a surface area of substrate 10, mask 12 being formed within porous silicon region 11 in the form of webs which pass over porous silicon region 11 and are connected at their ends to substrate 10.

Figure 2:
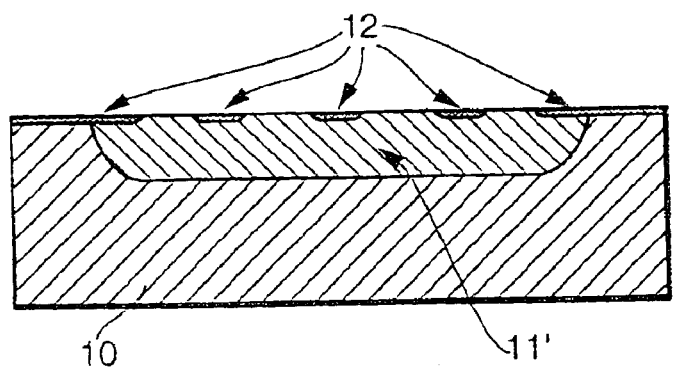
FIG. 2 shows another method step, including the webs thus produced.

FIG. 2 shows another method step in which, starting with FIG. 1, porous silicon region 11 has been converted by an oxidation step into a region 11' of porous silicon oxide.

Figure 3:
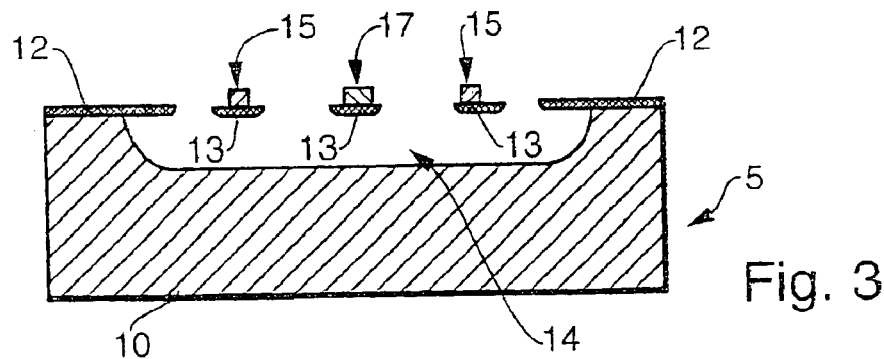
FIG. 3 shows a third method step, including sensor elements arranged on webs that are unsupported in some areas.

FIG. 3 illustrates how a heating element 17 and sensor components 15 have been applied to the surface of mask 12 by thin-film technology. In addition, FIG. 3 shows that after applying heating element 17 and/or sensor components 15, porous silicon oxide region 11' has been removed to form a recess 14 and webs 13 which are unsupported in at least some regions and have a thickness of less than 500 nm, in particular 100 nm to 200 nm and on which sensor components 15 and/or heating elements 17 are provided. According to FIG. 3, heating element 17 is embodied as a resistance conductor made of platinum, for example, running on a web 13. It is used to heat sensor components 15, to keep them at an operating temperature of 100° C., for example, or to bring the region which is heated by heating element 15 to a defined higher temperature relative to the region of sensor components 15. Sensor components 15 are also platinum resistance conductors applied by thin film technology in this example.

Moreover, it should be emphasized that almost any geometric shapes of unsupported web 13 on which sensor components 15 are applied are made possible by masking substrate 10 with mask 12 due to the isotropic etching behavior of porous silicon and/or the isotropic dissolution of silicon oxide.

Deposition of sensor components 15 and/or heating element 17 takes place preferably by physicochemical methods, e.g., with the help of a CVD method or by sputtering. Webs 13 are also designed to be as thin as possible so that sensor components 15 are thermally insulated as well as possible from substrate 10 despite that fact that webs 13 are made of silicon.

With regard to other known details of the production method, the deposition of heating elements 17 and/or sensor components 15, as well as the design of the recess 14 and details regarding the porosification of silicon, reference is made to German Published Patent Application No. 100 30 352 or PCT Publication No. 98/50763, where they are described in detail.

Figure 4:
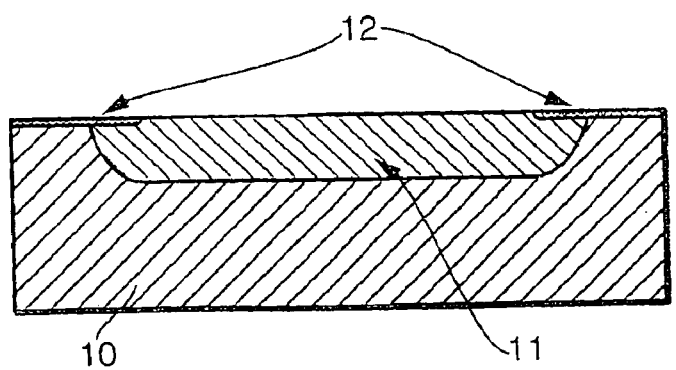
FIG. 4 illustrates the first method step of a second exemplary embodiment.
Figure 5:
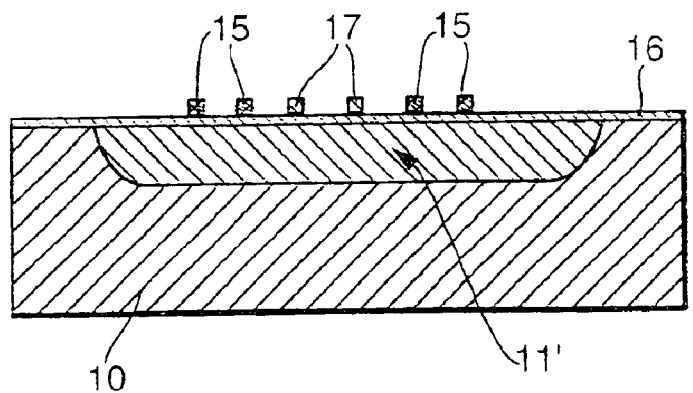
FIG. 5 illustrates another method step of this exemplary embodiment, where sensor components and a heating element have been produced.
Figure 6:
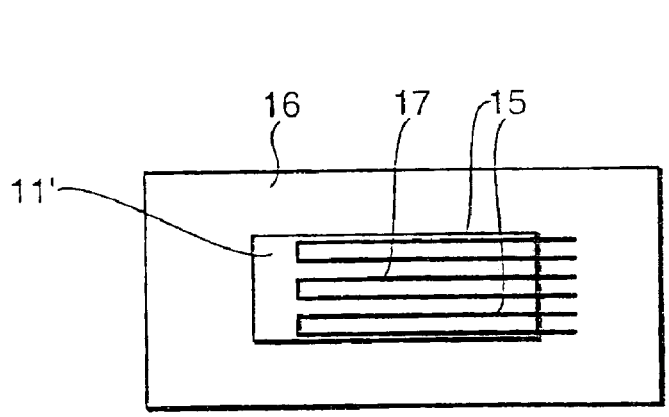
FIG. 6 shows a top view of FIG. 5.

FIGS. 4 through 6 illustrate an alternative exemplary embodiment for production of a flow sensor 5 as an alternative to FIGS. 1 through 3. According to FIG. 4, production begins first with a p-doped silicon wafer as substrate 10 which is provided with a mask of n-doped silicon. In addition, the surface of substrate 10 is provided again with a porous, preferably nanoporous or mesoporous, silicon region 11. FIG. 5 shows how porous silicon region 11 is converted to a corresponding porous silicon oxide region 11' by oxidation and how a cover layer 16 is then applied to the surface of substrate 10 and/or porous silicon oxide region 11'. Cover layer 16 is a layer having poor heat conductivity, such as a silicon nitride layer in the example described here. It provides the seal for porous silicon oxide region 11'. The thickness of cover layer 16 is 100 nm or more, for example.

In addition, it should also be pointed out that porous silicon region 11 and porous silicon oxide region 11' are preferably produced with a degree of porosity of more than 60% to minimize the mass of remaining silicon while at the same time ensuring adequate stability. Converting porous silicon to porous silicon oxide causes a further reduction in the thermal conductivity because silicon having good heat conductivity is converted to silicon oxide having poor heat conductivity.

It should be pointed out that silicon has a typical thermal conductivity of 150 W/Km, silicon oxide has a thermal conductivity of 1.4 W/Km, porous silicon has a thermal conductivity of 1 to 2 W/Km, and oxidized porous silicon has a typical thermal conductivity of 0.3 to 1.4 W/Km. Therefore, it is preferable to produce a porous silicon oxide region 11' in order to ensure the best possible thermal insulation of sensor component 15.

In FIG. 5, cover layer 16 is preferably applied similarly to the application of sensor components 15 and heating elements 17, i.e., by a physicochemical deposition method, e.g., a CVD method or by sputtering. With regard to the best possible thermal insulation of sensor component 15 with respect to substrate 10, it is also expedient if the thickness of porous silicon region 11' is selected to be as large as possible, e.g., between 50 μm and 200 μm.

After deposition of cover layer 16 on the surface of substrate 10, i.e., the surface of porous silicon oxide region 11', heating element 17 and sensor components 15 are then deposited in the form of platinum resistance conductors as in FIG. 3. Heating element 17 is used again for heating sensor component 15 or entire cover layer 16.

The function of flow sensor 5 is based on the fact that a change in the temperature of sensor component 15 occurs due to the flow of a medium, e.g., a gas to which flow sensor 5 is exposed, which is manifested in a change in the electric resistance of sensor component 15. This change in electric resistance is then detected by analyzer means (not shown).

FIG. 6 shows a top view of FIG. 5, where it is readily apparent that two sensor components 15 have been produced side-by-side on the surface of porous silicon oxide region 11' and are separated from heating element 17. It should be emphasized that both heating element 17 and sensor elements 15 are situated on cover layer 16 according to FIG. 6, so that porous silicon oxide region 11' illustrated here is not actually visible in the top view.

Figure 7:
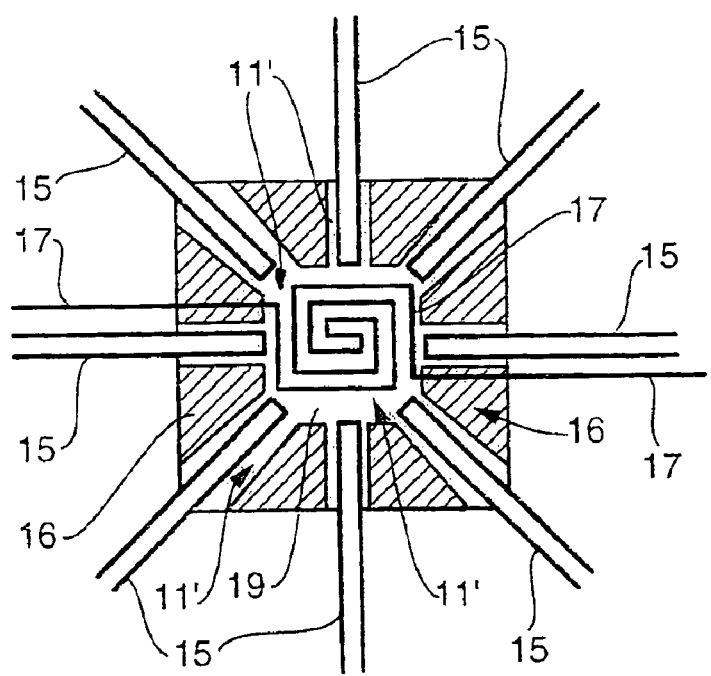
FIG. 7 illustrates a third exemplary embodiment of a flow sensor for angle-dependent detection of a gas flow.

FIG. 7 illustrates a third exemplary embodiment of angle-dependent detection of a gas flow with the help of flow sensor 5. To do so, a porous silicon oxide region 11' is first produced on the surface of substrate 10 made of p-doped silicon in the manner described above with the help of a suitable mask 12; in the concrete example, this porous silicon oxide region points in a star pattern toward a central area 19, which is also made of porous silicon. In addition, a cover layer 16 which seals porous silicon oxide regions 11' is then applied to the entire surface of substrate 10. This cover layer 16 is not shown in FIG. 7, but it is completely similar to that in FIG. 5. Finally, in the exemplary embodiment illustrated here, the regions of substrate 10 which are not taken up by a porous silicon region 11' are provided with another heat conducting cover layer 18, e.g., a silicon layer or a platinum layer which prevents thermal feedthrough between individual sensor components 15.

In a modification of FIG. 7, it is also possible to omit cover layer 16 according to FIG. 5 in the exemplary embodiment according to FIG. 7, because sealing of porous silicon oxide regions 11' is not absolutely necessary. However, this embodiment has disadvantages with regard to long-term stability. In this case, it is not absolutely necessary to apply additional cover layer 18 because the surface of substrate 10 is made of silicon anyway in the regions of the surface of substrate 10 which are not covered by porous silicon oxide region 11'. Preferably, however, cover layer 18 is also applied in this case to exactly define the edges, i.e., borders of the heat sink thus produced.

Finally, FIG. 7 shows that a total of eight sensor components 15 in the form of U-shaped platinum resistance conductors are applied to the surface of substrate 10 in the area of porous silicon oxide regions 11'. These sensor components 15 are thus completely similar to those in FIG. 6, FIG. 3 or FIG. 5. In addition, a heating element 15 in the form of a platinum resistance conductor which is acted upon by an electric current via appropriate feeder lines is also provided on the central area 19 according to FIG. 7 so that sensor components 15 are heatable via heating element 17. Sensor components 15 are preferably arranged in a star pattern or in a cross around central heating element 17 so that an angle-dependent detection of a gas flow is possible with the help of such a flow sensor 5.

The angular accuracy obviously depends here on the placement of sensor components 15, i.e., the number of sensor components 15, i.e., the resolution of flow sensor 5 may be increased significantly through the placement of more than eight sensor components 15. As shown in FIG. 7, a helical shape having a square base area is one possible form of heating element 17.

It is obvious that a number of possibilities exist with respect to the layout of flow sensors 5 described here. For example, on the basis of FIG. 3, it is readily possible to produce a network of webs 13, each bridging recess 14, so they are at least mostly unsupported, with sensor components 15 and a plurality of heating elements 17 situated on them, e.g., according to FIG. 7.

What is claimed is:

1. A flow sensor, comprising:
   a substrate;
   at least one sensor component that is sensitive to a flow of a medium; and
   a region having a poor heat conductivity compared to the substrate and by which the at least one sensor component is separated in at least some areas from the substrate by an arrangement of the at least one sensor component over the region having poor heat conductivity, wherein one of the following is present:
   the region having the poor heat conductivity includes one of a porous silicon region and a porous silicon oxide region, and
   the region having the poor heat conductivity includes a recess in a surface of the substrate above which the at least one sensor component is situated on at least one web that bridges the recess and is at least mostly unsupported.

2. The flow sensor as recited in claim 1, wherein:
   the flow sensor is for analysis of a gas flow.

3. The flow sensor as recited in claim 1, wherein:
   the region having the poor heat conductivity includes a surface region of the substrate.

4. The flow sensor as recited in claim 1, wherein:
   the substrate includes a silicon body.

5. The flow sensor as recited in claim 4, wherein:
   the silicon body includes a p-doped silicon wafer.

6. The flow sensor as recited in claim 1, wherein:
   the at least one sensor component includes a printed conductor.

7. The flow sensor as recited in claim 6, wherein:
   the printed conductor includes one of a platinum resistance conductor, a thermistor, a thermocouple, and a thermoelectric pile.

8. A flow sensor, comprising:
   a substrate;
   at least one sensor component that is sensitive to a flow of a medium; and
   a region having a poor heat conductivity compared to the substrate and by which the at least one sensor component is separated in at least some areas from the substrate by an arrangement of the at least one sensor component over the region having poor heat conductivity, wherein one of the following is present:
   the region having the poor heat conductivity includes one of a porous silicon region and a porous silicon oxide region, and the region having the poor heat conductivity includes a recess in a surface of the substrate above which the at least one sensor component is situated on at least one web that bridges the recess and is at least mostly unsupported; and wherein the region having the poor heat conductivity includes a cover layer in at least some areas, and the at least one sensor component is situated at least partially on the cover layer.

9. The flow sensor as recited in claim 8, further comprising:
at least one heating element including a heating conductor.

10. The flow sensor as recited in claim 8, wherein:
the cover layer includes a silicon nitride layer.

11. A flow sensor, comprising:
a substrate;
at least one sensor component that is sensitive to a flow of a medium;
a region having a poor heat conductivity compared to the substrate and by which the at least one sensor component is separated in at least some areas from the substrate by an arrangement of the at least one sensor component over the region having poor heat conductivity, wherein one of the following is present:
the region having the poor heat conductivity includes one of a porous silicon region and a porous silicon oxide region, and
the region having the poor heat conductivity includes a recess in a surface of the substrate above which the at least one sensor component is situated on at least one web that bridges the recess and is at least mostly unsupported; and
at least one heating element, wherein:
the at least one sensor component includes a plurality of sensor components situated around the at least one heating element, the sensor components each being separated from the substrate in at least some areas by the region having the poor heat conductivity.

12. The flow sensor as recited in claim 11, wherein:
the plurality of sensor components is situated around the at least one heating element in one of a symmetrical pattern, a cross pattern, and a star pattern.

13. The flow sensor as recited in claim 11, wherein:
the at least one web includes a network of webs, and
the sensor components and the at least one heating element are situated on the network of webs bridging one of the recess, the porous silicon region, and the porous silicon oxide region.

14. The flow sensor as recited in claim 11, wherein:
the at least one web has a thickness of less than 500 nm and is made at least mostly of silicon.

15. The flow sensor as recited in claim 11, wherein at least one of the following is present:

the porous silicon region includes one of nanoporous silicon and mesoporous silicon, and the porous silicon oxide region includes one of nanoporous silicon oxide and mesoporous silicon oxide.

16. A flow sensor, comprising:
a substrate;
at least one sensor component that is sensitive to a flow of a medium;
a region having a poor heat conductivity compared to the substrate and by which the at least one sensor component is separated in at least some areas from the substrate by an arrangement of the at least one sensor component over the region having poor heat conductivity, wherein one of the following is present:
the region having the poor heat conductivity includes one of a porous silicon region and a porous silicon oxide region, and
the region having the poor heat conductivity includes a recess in a surface of the substrate above which the at least one sensor component is situated on at least one web that bridges the recess and is at least mostly unsupported; and
at least one heating element configured to heat the at least one sensor component in at least some areas,
wherein the at least one heating element is separated in at least some areas from the substrate by the region having the poor heat conductivity, and
those regions of the substrate that are not taken up by the region having the poor heat conductivity are provided with a cover layer having a good heat conductivity.

17. The flow sensor as recited in claim 16, wherein:
the cover layer includes one of a silicon layer and a platinum layer.

18. A flow sensor, comprising:
a substrate;
at least one sensor component that is sensitive to a flow of a medium; and
a region having a poor heat conductivity compared to the substrate and by which the at least one sensor component is separated in at least some areas from the substrate by an arrangement of the at least one sensor component over the region having poor heat conductivity, wherein the region having the poor heat conductivity includes a recess in a surface of the substrate above which the at least one sensor component is situated on at least one web that bridges the recess and is at least mostly unsupported.

19. The flow sensor as recited in claim 18, further comprising:
at least one heating element configured to heat the at least one sensor component in at least some areas.

* * * * *